Figure 1:
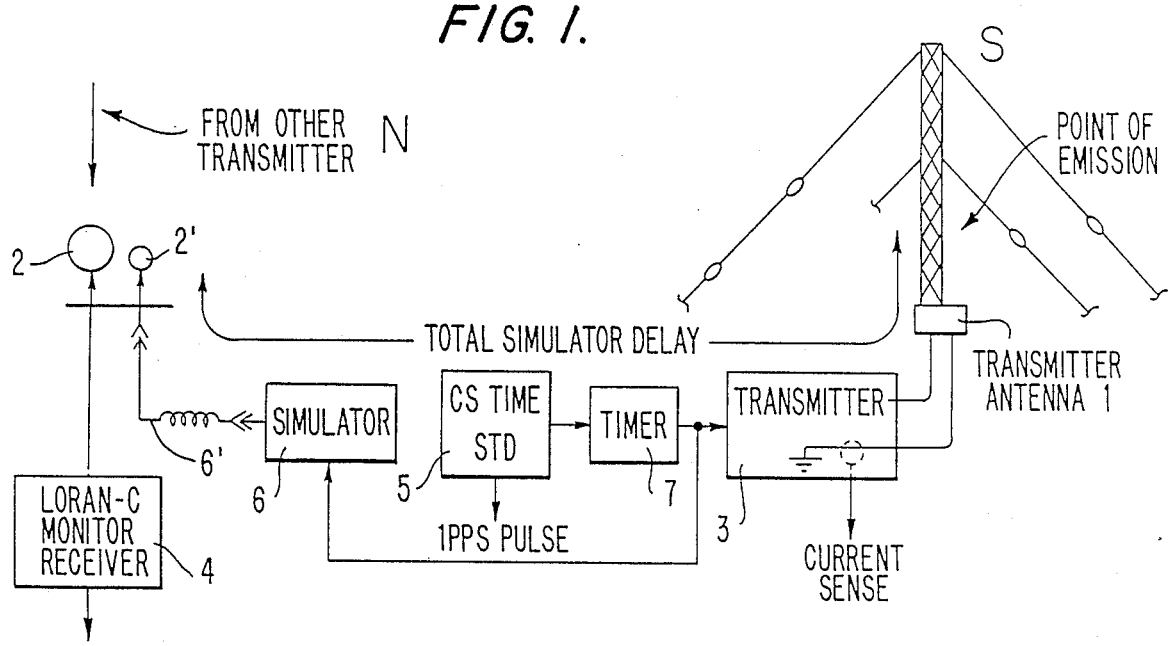

United States Patent [19]

Goddard

[11] Patent Number: 4,791,422
[45] Date of Patent: Dec. 13, 1988

[54] METHODS OF AND APPARATUS FOR MEASURING TIME OF ARRIVAL OF REMOTE LORAN-C AND RELATED SIGNALS AND EFFECTIVE TIME OF TRANSMISSION OF LOCAL SIGNALS AT TRANSMITTER SITES

[75] Inventor: Robert B. Goddard, Stoneham, Mass.
[73] Assignee: Megapulse Incorporated, Bedford, Mass.
[21] Appl. No.: 886,258
[22] Filed: Jul. 14, 1986
[51] Int. Cl.⁴ ............................................. G01S 1/24
[52] U.S. Cl. ......................................... 342/389; 434/1
[58] Field of Search ............... 342/389, 169, 165, 173; 434/5, 1, 2; 364/452

[56] References Cited

U.S. PATENT DOCUMENTS

| | | | |
|---|---|---|---|
| 3,684,962 | 8/1972 | Hottel, Jr. | 342/388 X |
| 3,786,334 | 6/1974 | Johannessen | 321/45 |
| 3,889,263 | 6/1975 | Johannessen | 342/388 |
| 3,921,076 | 11/1975 | Currie | 325/321 |
| 4,054,881 | 10/1977 | Raab | 342/448 |
| 4,151,528 | 4/1979 | Johannessen | 342/389 |
| 4,195,299 | 3/1980 | Van Etten | 342/389 |
| 4,314,251 | 2/1982 | Raab | 342/423 X |
| 4,396,918 | 8/1983 | Wallis | 342/388 |
| 4,416,017 | 11/1983 | Jasper et al. | 364/452 X |
| 4,513,378 | 4/1985 | Antkowiak | 364/452 X |
| 4,543,580 | 9/1985 | Bent et al. | 342/388 X |
| 4,636,795 | 1/1987 | Dano | 364/452 X |
| 4,667,199 | 5/1987 | Roberts | 434/2 X |
| 4,670,759 | 6/1987 | Fukuhara | 364/452 X |

OTHER PUBLICATIONS

Kayton et al, "Avionics Navigation Systems" Chapter 2.5.2, The Loran Position Fix, 1969, pp. 24 and 25.
"Loran-C in the Rho-Rho Mode", A. William Marchal, *UnderSea Technology*, Compass Publications, Inc., Arlington, VA, Apr. 1971.

Primary Examiner—Theodore M. Blum
Assistant Examiner—John B. Sotomayor
Attorney, Agent, or Firm—Rines and Rines, Shapiro and Shapiro

[57] ABSTRACT

A method of and apparatus for measuring time of arrival of remote Loran-C and related signals and effective time of transmission of local signals at Loran transmitter sites through use of a simulated Loran signal locally generated and coupled into the receiving antenna system that receives the remote signals in a time slot not occupied by the local transmitted signal.

9 Claims, 21 Drawing Sheets

SSIM DELAY = TD(S) − CD

NSIM DELAY = TD(N) + CD + 2·PTNS

METHODS OF AND APPARATUS FOR MEASURING TIME OF ARRIVAL OF REMOTE LORAN-C AND RELATED SIGNALS AND EFFECTIVE TIME OF TRANSMISSION OF LOCAL SIGNALS AT TRANSMITTER SITES

The present invention relates to methods of and apparatus for measuring time of arrival (TOA) of signals from remote navigation transmitters, as of the Loran-C or related types in synchronized chains of such transmitter sites, and the effective time of transmission (TOT) of signals locally transmitted at a transmitter site of the chain.

While not so restricted, the invention is particularly advantageous with Range-Range ("Rho-Rho") systems wherein cesium frequency standards are employed to control the Loran-C net and in which the mobile station navigating by the net transmissions, and equipped with an atomic standard, counts the time interval from a master station TOT to the TOA at the mobile station and the time interval from the master station TOT to the TOA of a slave station transmitter, and converts the same to ranges, as described, for example, in "Loran-C in the Rho-Rho mode", A. William Marchal, *Under Sea Technology*, April 1971. That latter conversion involves subtracting the baseline delay from the master to the slave transmitter and the coding delay (CD) in the slave station from the count between the master station TOT and the slave station signal TOA at the mobile station.

In practice, however, there are problems in proper measurement of the TOT and TOA of the signal from the remote transmitter—problems introduced by the presence of the large reflecting transmitter antenna structure or other objects at the site and unwanted phase shifts in the near-field where the receiving antenna is located at such site, and other problems residing in the receiver accurately handling the large magnitude of the signal radiated by the nearby transmitter on the site, both of which problems introduce errors in TOA and site TOT measurements.

In a transmitter chain which is to be used, for example, for the range navigation above described, it is necessary to control the timing of the transmissions very precisely with respect to some absolute time reference. In doing this, it is convenient to co-locate monitor receivers with the transmitters. For one thing, this avoids the need for separate real estate, power, etc. for the receivers. It also reduces the number of variables involved in the control problem.

One problem associated with the TOA measurement resides in the large magnitude of the signal radiated from the co-located transmitter, which cannot be handled accurately by most receivers. To solve this problem, one feature of the present invention involves deriving a simulated Loran signal which is in a fixed, known time relationship to the locally transmitted signal, and measuring the TOA of the remote signal with respect to this simulated signal. By arranging for the simulated signal to occur in a time slot not occupied by the local transmitted signal, this large signal cannot contaminate the measurement. Furthermore, it is desireable to introduce the simulated signal into the monitor receiver as near to the antenna as possible. This is because the remote signal transits through the antenna, antenna coupler, connecting cable to the receiver, and circuits within the receiver before it is time-compared to another signal. During this transit, phase shifts are experienced which may or may not be stable with time, temperature, etc. By introducing the second signal at the antenna, then this signal experiences the same phase shifts as the remote signal and errors are minimized.

The simulator technique is also thus useful in other and broader applications, namely in any range measurement where one is comparing the arrival time of a remote signal with respect to any local clock. Rather than make the comparison within the receiver circuits, the invention uses the clock to generate a simulted Loran (or other) signal and couples this into the antenna.

The use of a later-described right-angle loop in injecting the simulated signal alleviates another source of error when making a TOA measurement in the vicinity of large reflecting objects. The remote signal scattered from such large reflectors, is received by and introduces a phase shift in, the composite signal seen by the nearby monitor receiver which this feature obviates.

While the simulator technique and the right-angle loop technique thus address different sources of measurement error, and may be used independently of one another, they may be used in consort, as well, as described.

An object of the present invention, accordingly, is to provide a new and improved method of and apparatus for obviating such TOA and TOT measurement errors despite the constraint that the receiving antenna is located on the transmitter site.

A further object is to provide novel TOA and TOT and related measurement techniques of more general applicability, as well.

An additional object is to provide a novel local simulator technique useful by itself, as well, that obviates the problem of the large magnitude of the signal radiated from the co-located transmitter that normally cannot be handled accurately by most receivers.

Still a further object is to provide a novel right-angle loop simulator signal injection technique that alleviates the source of error when making a TOA measurement near large reflecting objects that scatter the remote signal and introduce a phase shift in the composite signal received by the nearby monitor receiver.

Other and further objects will be explained hereinafter and are more particularly delineated in the appended claims.

In summary, however, from one of its viewpoints, the invention embraces a method of measuring time of arrival (TOA) of Loran-C and similar signals from a remote transmitter at a local transmitter located at the same site at which the remote signal is to be received in a receiving antenna disposed within a short distance of the antenna field of the local transmitter, that comprises, receiving at the receiving antenna the remote signal from the said remote transmitter; generating at said site a simulated Loran signal in a fixed, known time relationship to the signal locally transmitted by the local transmitter; coupling the simulated signal into the receiving antenna; measuring the time of arrival of the remote signal received in the receiving antenna from the same remote transmitter and comparing the same with the simulated signal; and clocking the simulated signal to occur in a time slot not occupied by the signal from the local transmitter.

From another viewpoint, the invention embraces, also, the use of a novel right-angle loop simulator signal injection technique for alleviating sources of error when making time of arrival measurements near large reflecting and scattering objects. Preferred embodiment and best mode details and apparatus are later presented.

Figure 2A:
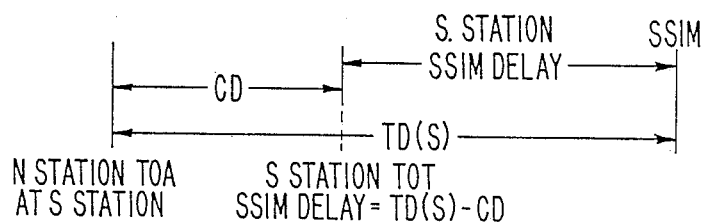
Figure 2B:
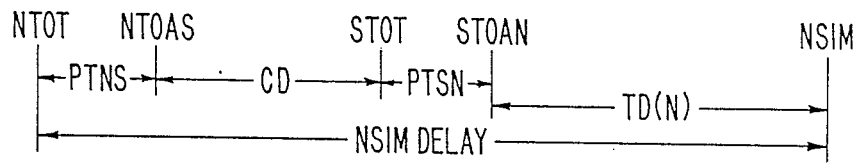

The invention will now be described with reference to the accompanying drawings, FIG. 1 of which is a schematic circuit and system diagram of the invention in preferred form; and FIGS. 2A and 2B are timing diagrams for determining measurements in the system of FIG. 1.

Referring to FIG. 1, at the slave transmitter site S of a chain including a master Rho-Rho Loran-C transmitter N hundreds of miles away, controlled by an intermediately located cesium-clock control station, both the local transmitter antenna 1 and the local receiving and monitoring antenna 2 are shown at the same site. Typically, for the 100 KHz Loran-C frequency, the antenna 1 may be 220 meters high with a scattered field extending far beyond the 300 meters or so (about 1 wavelength) of the antenna 1 where the receiving antenna 2 is disposed. The signal transmitted from the station N will be received at 2 and fed to the monitor receiver 4 as is well-known. The transmitter antenna 1 will transmit its Loran-C pulses under the control of its transmitter 3, as determined from the cesium time standard 5 and timer 7, as is also well-known—the transmitter, for example, being of the type disclosed in U.S. Pat. Nos. 3,786,334; 3,889,263; and 4,151,528 of common assignee herewith. The receiver may be of the type, for example, described in U.S. Pat. No. 3,921,076.

As for the first-named problem, it is difficult accurately to measure at 2-4 the TOT of a signal from a 250 kW transmitter when only 300 meters away from the antenna. The invention provides a technique, therefore, to measure the TOT indirectly. The timing purse from the timer 7 controlling the transmitter 3 is used to generate a simulated Loran signal by a simulating 100 KHz oscillator 6. The timing pulse used must, of course, have a fixed relationship, in time, to the effective TOT of the transmitter. This is a reasonable assumption since a control loop within the transmitter maintains a fixed relationship between the timing pulse and the antenna current, as is customary.

The simulated Loran signal is delayed and then sent via a cable 6' to a small loop antenna 2' which closely couples the simulated signal into the receiving loop 2. This is done to insure that any phase change occuring between the receiving antenna 2 and the receiver 4 would be experienced by both the remote received signal from N and the simulated signal from 6.

Thus, as before explained, the large magnitude of the signal radiated from the co-located transmitter antenna 1 cannot contaminate the TOA measurement in the receiver 4. The simulated Loran signal generated at 6 is in a fixed, known time relationship to the locally transmitted signal, and the TOA of the remote signal received from transmitter N is measured in the receiver 4 with respect to this simulated signal. By arranging for the simulated signal to occur in a time slot not occupied by the local transmitted signal at 1, large signal contamination of the measurement is avoided, as previously mentioned.

The remote signal transits through the receiving antenna 2, antenna coupler, connecting cable to the receiver 4 and circuits within the receiver, before it is time-compared to another signal. During this transit, phase shifts are experienced which, as before stated, may or may not be stable with time, temperature, etc. Through introducing the simulator signal at the antenna 2, this signal experiences the same phase shifts as the remote received signal and errors are minimized. Rather than making the comparison within the receiver circuits, the technique of the invention uses the clock timer 7 to generate the simulated Loran signal and couples this into the receiving antenna 2.

It now remains to determine the exact delay between the effective TOT of the transmitter 1-3 and the arrival time of the simulated signal at the receiving antenna. The top timing diagram of FIG. 2A for the local transmitter 1 suggests that, out on the baseline extension by eight or more wavelengths, the measurement of the coding delay (CD) during recording time-delays TD(s) will enable calculation of the simulator delay. A similar situation exists at the master site N where coding delay plus twice the propagation time between stations N and S (PTNS) is measured on the baseline extension.

The simulated signal delay at station S (SSIM) is shown in FIG. 2A as equal to the time delay at station S (TC[s]) between the TOA of the remote signal from station or site N and the time of generation of the simulated signal at site S (SIM), minus the before-mentioned coding delay (CD). In FIG. 2B, it is evident that the delay of the simulated signal that would similarly be generated at station or side N (NSIM), is the time delay at station N (TD[N]) plus CD, plus two PTNS (above-defined).

Having once calibrated the simulators at N and S in this fashion, the computer control of the net (such as a PDP/11) can now continually calculate the coding delay and PTNS from the monitor TD's and the known delays.

As before stated, at each transmitter of the net, it is required to measure the time interval between its TOT and the TOA of the signal from the remote transmitter under the constraint that the receiving antenna be located on the local transmitter site. Thus, while the receiving antenna 2 could be located outside the ground plane of the Loran transmitting antenna 1, it could still be within 300 meters of the large antenna 1. There are two problems with this location of the receiving antenna. A first problem is that the field from the transmitting antenna 1 is very large (above the dynamic range of a normal receiver) and contaminated by several components which are not present in the more remote field several wavelengths away. The remote signal received from the site N, moreover, as before stated, is scattered by reflections from the large antenna 1 and other reflectors and the composite field seen by the receiving antenna 2 may contain an unwanted phase shift.

Previous work indicates that the scattered field 300 meters from a 220 meter tuned antenna 1 would be no greater than a few tenths of the size of the incident field. If the scattered field were in quadrature (worst case) and 0.3 of the incident field, a phase shift of 500 ns would result. Although this relationship under some conditions may be stable, it was preferred to discriminate between the two fields by placing the loop receiving antenna 2, say 300 meters from the big antenna 1, and oriented at right angles to the baseline between the transmitters at 1 (site S) and site N, as shown. A discrimination of greater than 40 dB between the incident and scattered field can thus be obtained in practice and this discrimination reduces any phase shift caused by the scattered field to less than 5 ns.

While, as previously explained, the simulated technique of the invention and the right-angle loop orientation may be independent of each other, they may synergistically be used together, as described. The use of the right-angle loop 2 alleviates one source of error when making a TOA measurement in the vicinity of a large reflecting object, namely, the remote signal being scattered from the large reflector, this scattered signal otherwise being received by and introducing a phase shift in the composite signal seen by the nearby monitor receiver 4.

Further modifications will occur to those skilled in this art and such are considered to fall within the spirit and scope of the invention as defined in the appended claims.

What is claimed is:

1. A method of measuring time of arrival (TOA) of Loran-C and similar signals from a remote transmitter at a local transmitter located at the same site at which the remote signal is to be received in a receiving antenna disposed within a short distance of the antenna field of the local transmitter, that comprises, receiving at the receiving antenna the remote signal from the said remote transmitter; generating at said site a simulated Loran signal in a fixed, known time relationship to the signal locally transmitted by the local transmitter; coupling the simulated signal into the receiving antenna; measuring the time of arrival of the remote signal received in the receiving antenna from the same remote transmitter and comparing the same with the simulated signal; and clocking the simulated signal to occur in a time slot not occupied by the signal from the local transmitter.

2. A method of measuring time of arrival of Loran-C and similar signals from a remote transmitter at a local transmitter located at the same site at which the remote signal is to be received, as claimed in claim 1 and in which the said receiving of the remote signal from the remote transmitter is effected in a loop antenna located at said site in the vicinity of the local transmitter antenna and other reflecting objects that also introduce scattered components of the said remote signal into the loop antenna; orienting the loop in a plane substantially disposed at the right angles to the direction between the transmitters to obviate phase shifts in the received signals that could result from such scatter of the remote signal in order to obviate errors in the time of arrival measurement.

3. A method of measuring time of arrival of radio signals from a remote transmitter with respect to a local clock system located at the same site at which the remote signal is to be received in a receiving antenna that comprises, receiving at the receiving antenna the remote radio signal from the said remote transmitter; generating from the clock system at said site a simulated similar radio signal in a fixed, known time relationship to the local clock system; coupling the simulated radio signal into the receiving antenna; and measuring the time of arrival of the remote radio signal received in the receiving antenna from the said remote transmitter and comparing the same with the simulated radio signal.

4. A method as claimed in claim 1 and in which the transmitters are operated in range-range Loran-C master-slave mode.

5. In the measuring of time of arrival of Loran C and similar signals from a remote transmitter at a local transmitter site at which the remote signal is to be received within a short distance of the antenna field of the local transmitter, the method that comprises, receiving the remote signal in a receiving antenna system on said site; generating on said site a local simulated Loran-C signal in a coding delay time relationship to the signal to be transmitted at said site by the local transmitter; closely coupling the simulated signal into said receiving antenna system; the time delay between the said time of arrival of the remote signal and the time of the simulated signal minus the coding delay at the local transmitter to determine the time of signal transmission by the local transmitter.

6. A method of measuring time of arrival of Loran-C and similar signals from a remote transmitter at a local transmitter located at the same site at which the remote signal is to be received, that comprises receiving the remote signal from the remote transmitter in a loop antenna located at said site in the vicinity of the local transmitter antenna and other reflecting objects that also introduce scattered components of the said remote signal into the loop antenna; measuring the time of arrival of said remote signal as received in the loop antenna; and orienting the loop in a plane substantially disposed at rights angles to the direction between the transmitters to obviate phase shifts in the received signals that could result from such scatter of the remote signal in order to obviate errors in the time of arrival measurement.

7. Apparatus for measuring time of arrival of radio signals from a remote transmitter with respect to a local clock system located at the same site at which the remote signal is to be received in a receiving antenna, that comprises, means for receiving at the receiving antenna the remote radio signal from the said remote transmitter; means for generating from the clock system at said site a simulated similar radio signal in a fixed, known time relationship to the local clock; means for coupling the simulated radio signal into the receiving antenna; and means for measuring the time of arrival of the remote radio signal received in the receiving antenna from the said remote transmitter and comparing the same with the simulated radio signal.

8. Apparatus, as claimed in claim 7 and in which the said signals are Loran-C signals and a local transmitter is located at the same site with the said receiving antenna disposed within a short distance of the antenna field of the local transmitter, the generated simulated signal is a simulated Loran signal, and means is provided for clocking the simulated signal to occur in a time slot not occupied by the signal from the local transmitter.

9. Apparatus, as claimed in claim 8 and in which said receiving antenna is a loop antenna oriented in a plane subsantially disposed at right angles to the direction between the transmitters to obviate phase shifts in the received signals that could result from such scatter of the remote signal in order to obviate errors in the time of arrival measurement.

* * * * *